Aug. 27, 1968  M. J. GINSBERG ET AL  3,399,076
METHOD OF WETTING SILICON NITRIDE
Filed April 8, 1965

NON-WETTING

POOR

FAIR

GOOD

EXCELLENT

COMPLETE

INVENTORS
RICHARD H. KROCK
MICHAEL J. GINSBERG

BY Robert Levine
ATTORNEY

United States Patent Office 3,399,076
Patented Aug. 27, 1968

3,399,076
METHOD OF WETTING SILICON NITRIDE
Michael J. Ginsberg and Richard H. Krock, Peabody, Mass., assignors to P. R. Mallory & Co. Inc., Indianapolis, Ind., a corporation of Delaware
Filed Apr. 8, 1965, Ser. No. 446,606
4 Claims. (Cl. 117—121)

ABSTRACT OF THE DISCLOSURE

A nickel-titanium-silicon alloy is used to wet silicon nitride.

---

The present invention relates to an alloy which will wet silicon nitride in any form, ranging from the bulk variety to the more esoteric types such as whiskers and ribbons, and effect such wetting with a minimum of interface reaction. The wetted areas may then be soldered, brazed, or welded for attachment to other metallic surfaces.

Bulk silicon nitride possesses several valuable characteristics such as extreme refractoriness and hardness, and low density. It is also an excellent electrical insulator, highly resistant to thermal shock, and is chemically inert. The whisker form of silicon nitride has not only the aforementioned qualities but, in addition, it possesses a high elastic modulus and an extremely high (>500,000 p.s.i.) tensile strength. It is the last-named item which encourages the consideration of incorporating whiskers in materials to improve the overall strength of the composite. Unless the bond between the whiskers and the surrounding matrix is comparable in strength to that of the whiskers, however, the improvement realized in the composite will be only a fraction of the potential value possible.

Therefore, it is an object of this invention to provide a means of wetting silicon nitride in any of its forms.

It is also an object of this invention that such wetting means will result in a minimum of interface reaction between the base material and the wetting alloy.

A further object is to provide a method of wetting which will be relatively quick and economical.

Additional objects will become apparent from the following description considered in connection with the accompanying figures of the drawing, wherein like reference characters describe elements of similar function therein, and wherein the scope of the invention is determined rather from the dependent claims.

The drawings included are described as follows.

The sessile-drop method of determining the wetting qualities of a drop of liquid on a solid surface is explained fully in an article written by B. S. Ellefson and N. W. Taylor, titled "Surface Properties of Fused Salts and Glasses: Parts I and II," published in the Journal of the American Ceramic Society, vol. 21 (6),193–213 (1938).

Briefly, the test is based on determining the surface tension of a liquid drop by attaining equilibrium between the forces of gravity and surface tension. The illustrations show, graphically, the change in angle of contact of sessile-drops of materials of different wetting abilities.

Figure 1:
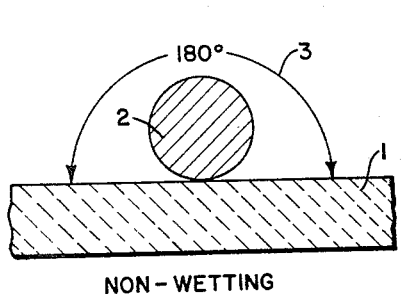
FIGURE 1 is an idealized representation of a sessile-drop which indicates non-wetting.

Referring to the drawings in detail, FIGURE 1 illustrates a typical case of non-wetting where the base 1 is silicon nitride, the sessile-drop 2 is in contact with base 1 at practically one point and the contact angle 3 appears as about 180 degrees.

Figure 2:
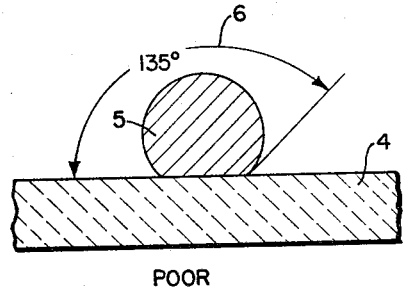
FIGURE 2 is an idealized representation of a sessile-drop which indicates poor wetting ability.

FIGURE 2 illustrates a condition where an appreciable amount of wetting is shown. Here the base 4 is silicon nitride, the sessile-drop 5 is a poor wetting alloy and the contact angle 6 is about 135 degrees.

Figure 3:
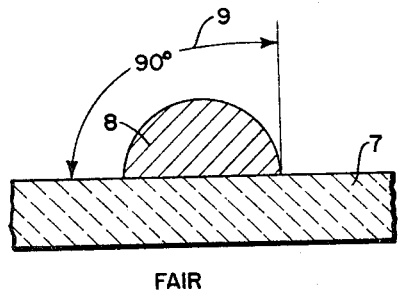
FIGURE 3 is an idealized representation of a sessile-drop which indicates fair wetting ability.

FIGURE 3 pictures a condition where a considerable amount of wetting has taken place. The base 7, again, is silicon nitride, the sessile-drop 8 is a fairly good wetting alloy, and the contact angle 9 is about 90 degrees.

Figure 4:
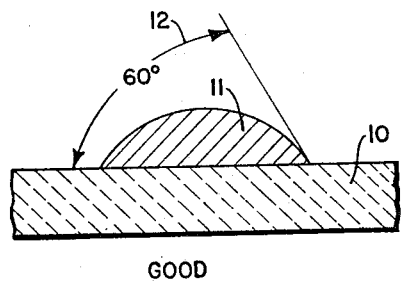
FIGURE 4 is an idealized representation of a sessile-drop which indicates good wetting ability.

FIGURE 4 shows a condition where the wetting is greater than the previous example. Here, again, the base 10 is silicon nitride, the sessile-drop 11 is an alloy with good wetting ability, and the contact angle 12 is about 60 degrees.

Figure 5:
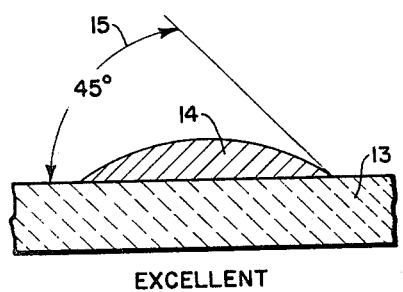
FIGURE 5 is an idealized representation of a sessile-drop which indicates excellent wetting ability.

FIGURE 5 illustrates the effect of still greater wetting. The base 13 is silicon nitride, the sessile-drop 14 is an alloy of excellent wetability, and the contact angle 15 is about 45 degrees.

Figure 6:
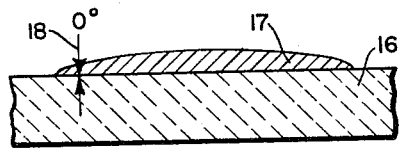
FIGURE 6 is an idealized representation of a sessile-drop which shows complete wetting.

FIGURE 6 indicates the result of complete wetting. Again, the base 16 is silicon nitride, the sessile-drop 17, which is composed of a super-wetting alloy, is virtually flat, resulting in a contact angle 18 of practically zero.

It is generally accepted, in the art, that contact angles less than 90 degrees are satisfactory for most applications and those over 90 dgerees are questionable. The contact angle achieved by the present invention is about 45 degrees, which is considered as having excellent wetting characteristics.

The alloy comprising this invention is formed of nickel, titanium and silicon in the following proportions by weight:

| | Percent |
|---|---|
| Nickel | 90 |
| Titanium | 7.5 |
| Silicon | 2.5 |

Nickel was selected because of its high melting point and strength; titanium was chosen because of its ability to lower the surface area energy between a liquid and solid phase, thus increasing wetability; silicon was selected to slake the affinity of titanium for silicon, reducing the reaction on the silicon nitride.

The alloy was pressed into a powder compact and melted upon a silicon nitride plaque in a nitrogen atmosphere (with a small but undetermined amount of oxygen present) and heated at 1550° C. for about 10 minutes. At that time the molten alloy had formed a sessile-drop with a contact angle of about 45 degrees. This indicates excellent wetting.

Some surface changes were noted at the alloy-nitride interface but it could not be determined whether that was caused by chemical attack by the alloy or surface migration of the atoms in the silicon nitride plaque.

Nominal variations in the alloy may be made to modify certain characteristics. For example, reducing the titanium content raises the process temperature and reduces the surface reaction between the alloy and the nitride. Increasing the amount of silicon also reduces the surface reaction.

The integrity of the silicon nitride tends to be preserved by the use of the nitrogen atmosphere, reducing the interfacial reaction, particularly with added silicon.

The present invention, in another of its aspects, relates to novel features of the instrumentalities described herein for teaching the principal object of this invention and to the novel principles employed in the instrumentalities whether or not these features and principles may be used in the said object and/or in the said field.

The detailed explanation of the present invention, as hereinbefore described in one of its embodiments, is merely illustrative and not exhaustive in scope. Since many widely different embodiments of this invention may be made without departing from the scope thereof, it is intended that all matter contained in the above description and shown in the accompanying drawing shall be interpreted as illustrative and not in a limiting sense.

Having disclosed completely the nature of this invention, the following claims are made:

1. A method of wetting silicon nitride which comprises the steps of providing an alloy consisting essentially of about 90 percent nickel by weight, the balance being titanium and silicon, placing said alloy on said silicon nitride, and melting and heating said alloy.

2. A method of wetting silicon nitride according to claim 1, wherein said heating is carried out in a nitrogen atmosphere.

3. A method of wetting silicon nitride which comprises the steps of providing an alloy consisting of about 90 percent nickel, 7.5 percent titanium, and 2.5 percent silicon by weight, placing said alloy on said silicon nitride, and melting and heating said alloy.

4. A method of wetting silicon nitride according to claim 3, wherein said heating is carried out in a nitrogen atmosphere.

References Cited

UNITED STATES PATENTS

| 2,159,810 | 5/1939 | Lenz et al. | 75—170 |
| 2,899,302 | 8/1959 | Cape et al. | 75—170 |
| 3,311,470 | 3/1967 | Wakeman et al. | 75—170 |

FOREIGN PATENTS

| 487,263 | 6/1938 | Great Britain. |

WILLIAM L. JARVIS, *Primary Examiner.*